United States Patent

Yamazaki et al.

[11] Patent Number: 5,499,753
[45] Date of Patent: Mar. 19, 1996

[54] CAPSTAN MOTOR AND SHEET METAL BEARING HOUSING THEREOF

[75] Inventors: Shigeki Yamazaki; Kazuhiro Kato; Takayuki Ishii; Hisao Sakai, all of Chiba, Japan

[73] Assignee: Sony Corporation, Tokyo, Japan

[21] Appl. No.: 277,515

[22] Filed: Jul. 19, 1994

[30] Foreign Application Priority Data

Jul. 23, 1993 [JP] Japan .................................. 5-202624

[51] Int. Cl.⁶ ................................................. B65H 20/00
[52] U.S. Cl. .......................... 226/194; 242/354; 242/358
[58] Field of Search ..................................... 226/194, 190, 226/188, 181, 183; 384/295, 296; 242/354, 358

[56] References Cited

U.S. PATENT DOCUMENTS

| | | | |
|---|---|---|---|
| 3,462,057 | 8/1969 | Yamamoto | 226/194 X |
| 3,770,177 | 11/1973 | Dattilo | 226/194 |
| 4,008,841 | 2/1977 | Dattilo | 226/194 |
| 4,630,149 | 12/1986 | Ida | 242/354 X |
| 5,263,625 | 11/1993 | Saito | 242/358 X |

*Primary Examiner*—Lenard A. Footland
*Attorney, Agent, or Firm*—Ronald P. Kananen

[57] ABSTRACT

A bearing housing of a capstan motor, for supporting a rotating shaft of the capstan motor. The housing is formed from sheet metal and has a flange member, a housing body extending from the flange member in an axial direction of the rotating shaft and a deep recess for exposing the rotating shaft. The housing also has a bearing collar made of metal mounted on the housing body for rotatably supporting the rotating shaft. This collar has a flange portion which abuts against an inside surface of the housing body and another portion press-fitted with a mounting hole formed through said housing body. A mounting board is mounted on one surface of the flange member and a motor board is mounted on another surface of the flange member. A component mounted on the mounting board is protected from interference by an escape portion on the flange member.

8 Claims, 7 Drawing Sheets

F I G. 1A
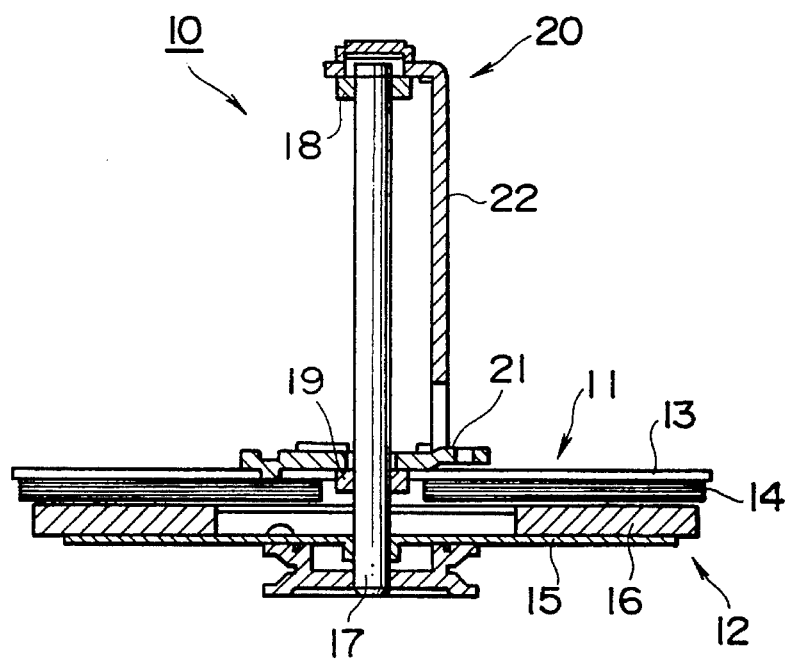
F I G. 1B
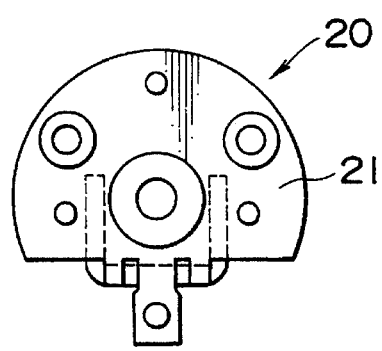
F I G. 1C
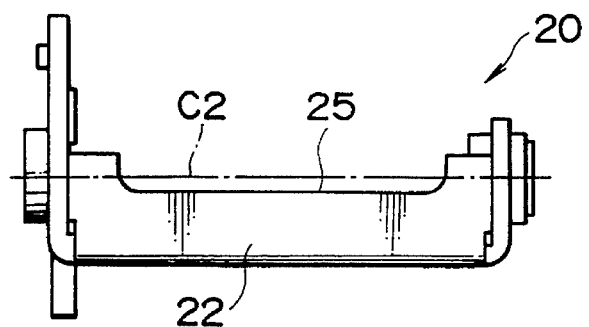

# CAPSTAN MOTOR AND SHEET METAL BEARING HOUSING THEREOF

BACKGROUND OF THE INVENTION

1. Field of the Invention

The present invention relates to a capstan motor for use in a VTR or the like, and also to an improvement in a bearing housing for supporting a rotating shaft of the capstan motor.

2. Description of the Related Art

FIG. 14 is a sectional view of a conventional bearing housing 1 for use with a capstan motor.

The bearing housing 1 is formed mostly by casting, especially by die casting. In general, die casting provides a high accuracy of products and almost eliminates a need of machine finishing, so that it is widely used for manufacture of such a bearing housing.

Thus, the bearing housing 1 is formed as an integral body manufactured by die casting. The bearing housing 1 has a substantially circular flange portion 2 to be fixed to a mounting board on a chassis (not shown) of a VTR or the like.

Although not shown, a flat capstan motor having a stator portion and a rotor portion is provided on a left-hand surface of the flange portion 2 as viewed in FIG. 14, and a rotating shaft extends from the rotor portion into the bearing housing 1 along a center line C1 of the bearing housing 1.

A housing body 4 extends from a right-hand surface of the flange portion 2 as viewed in FIG. 14, and has a hollow cylindrical shape so as to fixedly mount therein a pair of bearings 3 for rotatably supporting the rotating shaft.

A cylindrical wall of the housing body 4 is partially cut away to form a window-like recess 5 from which the rotating shaft is partially exposed.

The capstan motor provided with the bearing housing 1 is mounted perpendicularly to the chassis of the VTR, thereby receiving in the recess 5 a magnetic tape (not shown) traveling with its transverse direction according with a longitudinal direction of the bearing housing 1.

Accordingly, the magnetic tape is kept in contact with the rotating shaft exposed from the recess 5, thereby receiving a traveling force from rotation of the rotating shaft.

In the bearing housing 1 constructed above or the capstan motor provided with the bearing housing 1, there is a problem that a die for manufacturing the bearing housing 1 by die casting is expensive.

Further, a pinch roller (not shown) is pressed against the rotating shaft according to a traveling mode of the magnetic tape, and a pressing force of the pinch roller is applied through the bearings 3 to the elongated housing body 4.

Accordingly, there is a possibility that the capstan motor mounted so as to stand upright from the chassis may be gradually inclined as time proceeds.

To cope with this problem, it is considered to increase the strength of the bearing housing 1 by thickening the wall of the bearing housing 1. However, a material cost for the bearing housing 1 is increased by the thickening of the wall to cause an increase in manufacturing cost.

Further, since the bearing housing 1 is integrally formed by using a die, the size (depth) of the recess 5 is limited. Accordingly, when the bearing housing 1 is mounted on the chassis of the VTR in such a manner that a tape traveling path is bent about the rotating shaft, a wide space for mounting parts associated with the capstan motor is required.

Such a wide space causes a hindrance against a reduction in size of equipment in which the capstan motor is mounted.

SUMMARY OF THE INVENTION

It is accordingly an object of the present invention to provide a capstan motor and a bearing housing thereof which can be manufactured at a low cost.

It is another object of the present invention to provide a capstan motor and a bearing housing thereof which are strong in structure.

It is a further object of the present invention to provide a capstan motor and a bearing housing thereof which are advantageous for a reduction in size of equipment in which the capstan motor and the bearing housing are mounted.

According to the present invention, there is provided a bearing housing of a capstan motor, for supporting a rotating shaft of the capstan motor, the bearing housing being formed from sheet metal and having a relatively deep recess for exposing the rotating shaft.

Preferably, the bearing housing comprises a flange member and a housing body extending from the flange member in an axial direction of the rotating shaft, the housing body having opposed side portions bent in a direction where a pinch roller is pressed against the rotating shaft.

In one embodiment, the housing body is formed independently of the flange member.

In another embodiment, the housing body is formed integrally with the flange member.

Moreover, the bearing housing further comprises a bearing metal mounted on the housing body for rotatably supporting the rotating shaft, the bearing metal having a flange portion abutting against an inside surface of the housing body and a press-fitting portion press-fitted with a mounting hole formed through the housing body, the press-fitting portion having an inner diameter greater than that of the flange portion.

Preferably, a mounting board for mounting a component thereon is mounted on one surface of the flange member, and a motor board is mounted on another surface of the flange member, the flange member having an escape portion for preventing interference with the component to be mounted on the mounting board at a position adjacent to the capstan motor.

According to the present invention, there is also provided a capstan motor comprising a flat stator portion, a flat rotor portion having a rotating shaft, and a bearing housing for supporting the rotating shaft, the bearing housing being formed from sheet metal and having a relatively deep recess for exposing the rotating shaft.

With this construction of the present invention, the bearing housing of the capstan motor is formed from sheet metal. Accordingly, no expensive die is necessary.

Further, the size of the recess of the bearing housing can be arbitrarily set by blanking the sheet metal into a suitable shape.

Further, the opposed side portions of the housing body are bent in a given direction, thereby increasing the strength of the housing body without the need of increasing the thickness of the sheet metal.

As apparent from the above description, the capstan motor and the bearing housing thereof according to the present invention can exhibit such effects that the weight can be reduced, the strength in structure can be increased, and equipment in which the capstan motor and the bearing housing are mounted can be reduced in size.

Other objects and features of the invention will be more fully understood from the following detailed description and appended claims when taken with the accompanying drawings.

BRIEF DESCRIPTION OF THE DRAWINGS

FIG. 1A is a schematic sectional view of a preferred embodiment of the capstan motor and the bearing housing thereof according to the present invention;

FIG. 1B is a bottom plan view of the bearing housing shown in FIG. 1A;

FIG. 1C is a side view of the bearing housing shown in FIG. 1A;

DETAILED DESCRIPTION OF THE PREFERRED EMBODIMENTS

Figure 2:
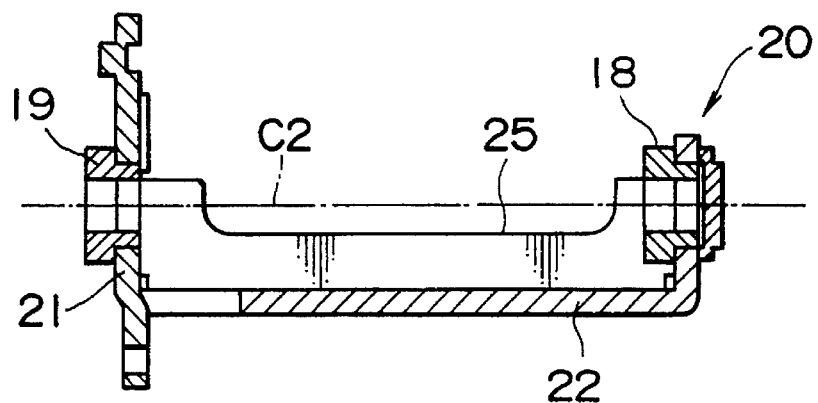
FIG. 2 is a schematic sectional view of the bearing housing shown in FIG. 1A.

A preferred embodiment of the present invention will now be described in detail with reference to the accompanying drawings.

While the embodiment described below is a preferred form of the present invention and therefore includes various limitations technically preferred, the scope of the present invention is not limited to the preferred embodiment unless otherwise specified in the following description.

FIGS. 1A to 1C show a preferred embodiment of a capstan motor and a bearing housing thereof according to the present invention, in which FIG. 1A is a schematic sectional view of the capstan motor; FIG. 1B is a bottom plan view of the bearing housing; and FIG. 1C is a side view of the bearing housing.

Referring to FIG. 1A, the capstan motor generally denoted by reference numeral 10 is provided at its base portion with a stator portion 11 and a rotor portion 12 both having a flat form as shown, and includes a bearing housing 20 for supporting a rotating shaft 17 of the rotor portion 12.

The stator portion 11 includes a mounting portion (mounting board) 13 and a plurality of coils 14 arcuately arranged on a lower surface of the mounting portion 13 as viewed in FIG. 1A. A flange member 21 of the bearing housing 20 is fixedly mounted on an upper surface of the mounting board 13 as viewed in FIG. 1A.

The rotor portion 12 includes a substantially disk-shaped yoke 15, a plurality of magnets 16 arcuately arranged on an upper surface of the yoke 15 so as to face the coils 14, and a rotating shaft 17 supported so as to rotate integrally with the yoke 15 and extending vertically as viewed in FIG. 1A.

The magnets 16 of the rotor portion 12 are preliminarily magnetized to have multiple poles so that S-poles and N-poles are alternately arranged in a circumferential direction of the rotor portion 12.

Accordingly, when the coils 14 of the stator portion 11 are sequentially supplied with an electric current by a suitable means not shown, a magnetic field of the magnets 16 of the rotor portion 12 acts to generate an electromagnetic force and thereby rotate the rotating shaft 17 in a given direction.

In such a capstan motor 10, a tape having a given width is required to be fed by the rotating shaft 17, so that the rotating shaft 17 is elongated vertically as shown.

Accordingly, the capstan motor 10 includes the bearing housing 20 having a pair of bearing collars 18 and 19 made of metal for rotatably supporting the elongated rotating shaft 17.

In this preferred embodiment, the bearing housing 20 is formed from a galvanized sheet iron or normal sheet steel subjected to plating such as chromate treatment, for example.

In the case where the bearing housing 20 is formed from such normal sheet steel, the plating may be carried out after blanking to be hereinafter described.

As shown in FIG. 1B, the bearing housing 20 is provided at its base portion with the flange member 21 which is formed as a semicircular piece of sheet metal. Further, as shown in FIG. 1C, the bearing housing 20 includes a housing body 22 elongated in an axial direction of the rotating shaft 17 of the capstan motor 10 and having a substantially U-shaped cross section.

As shown in FIG. 2, the bearing collars 18 and 19 for rotatably supporting the rotating shaft 17 of the capstan motor 10 are fixedly mounted on the housing body 22 at one end thereof and the flange member 21, respectively.

These bearing collars 18 and 19 will be described later in more detail.

As shown in FIG. 2, opposed side portions of the housing body 22 are partially cut away to form a pair of recesses 25 elongated in the axial direction of the rotating shaft 17, thus defining a window from which the rotating shaft 17 is partially exposed.

Figure 14:
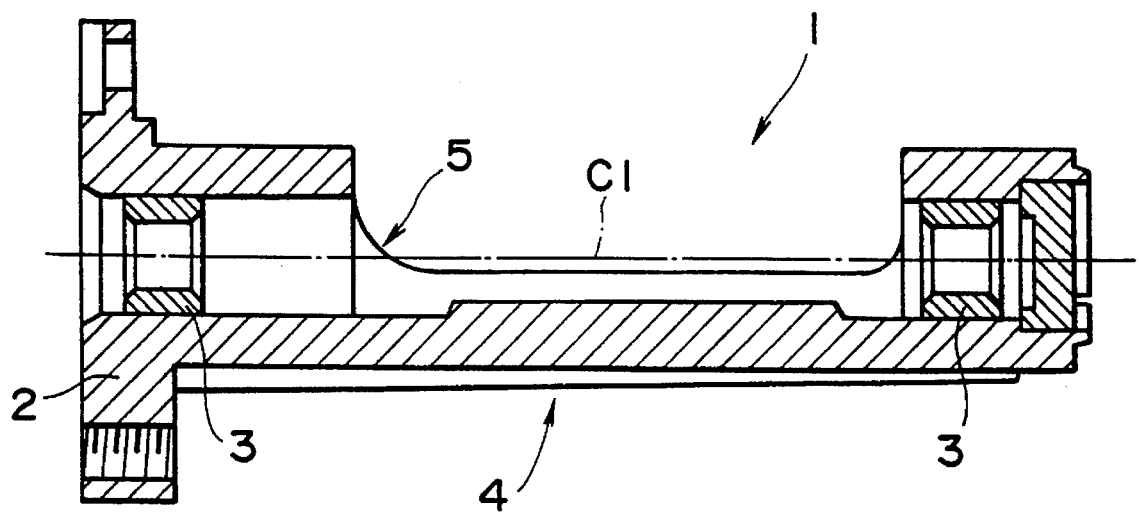
FIG. 14 is a schematic sectional view of a bearing housing in the related art.

It should be appreciated that each recess 25 is considerably deeper than the recess 5 shown in FIG. 14 illustrating the related art as apparent from comparison of a center line C2 of the housing body 22 with the center line C1 shown in FIG. 14. The depth of each recess 25 is arbitrarily set according to a design of equipment such as a VTR in which the capstan motor 10 is to be mounted.

FIGS. 3A, 3B, FIG. 4A 4B and 4C show a process of forming the bearing housing 1.

Figure 3A:
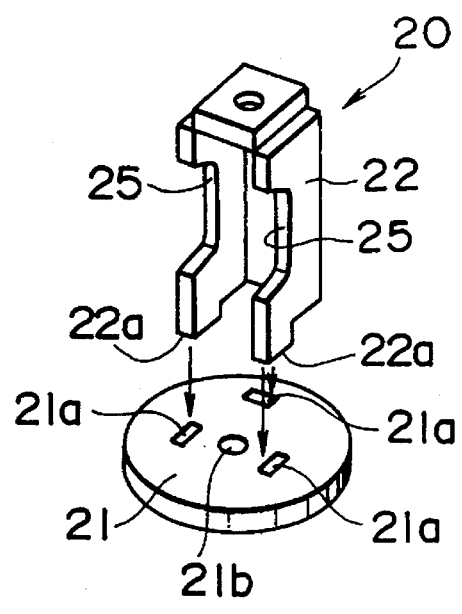
FIGS. 3A and 3B are an exploded perspective view and a development, respectively, illustrating a process of forming the bearing housing shown in FIG. 1A.
Figure 3B:
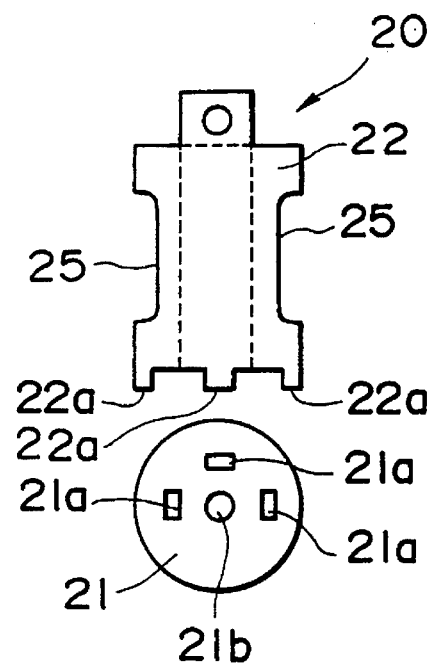

First, sheet metal stock is blanked to form two pieces of sheet metal according to the shapes of the housing body 22 and the flange member 21 as shown in FIG. 3B.

In this blanking, the outer size of the housing body 22 is so decided as to make the size (depth) of each recess 25 accord to a specification of equipment.

The disk-shaped sheet metal as the flange member 21 is formed with a central hole 21b through which the rotating shaft 17 is to be inserted. Further, a plurality of engagement holes 21a are formed around the central hole 21b, so as to respectively engage with a plurality of projections 22a formed at the lower end of the housing body 22.

Secondly, the sheet metal as the housing body 22 is bent along a dotted line shown in FIG. 3B, and the projections 22a of the housing body 22 are inserted through the engagement holes 21a of the flange member 21 as shown in FIG. 3A. Finally, the housing body 22 and the flange member 21 are fixed together by crimping of the projections 22a or welding.

In this manner, the bearing housing 20 can be formed from two pieces of sheet metal.

Figures 4A, 4B, 4C:
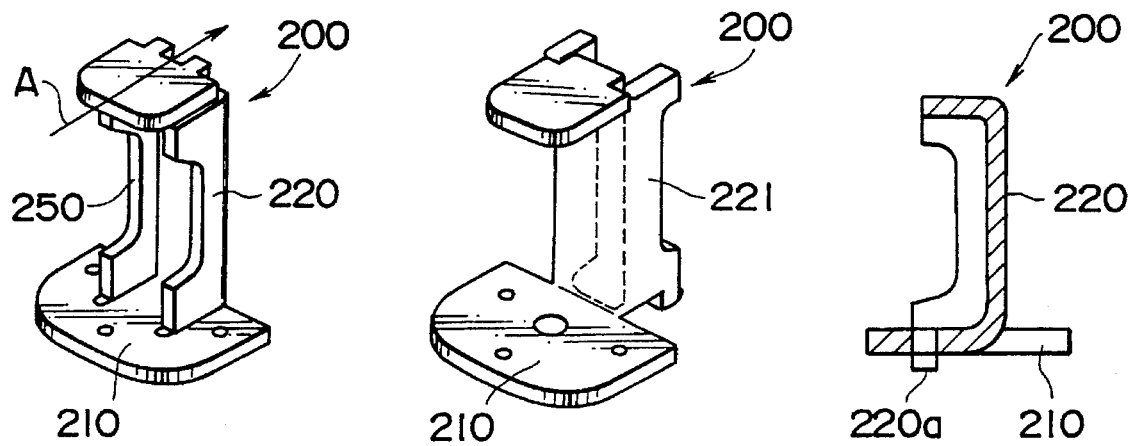
FIGS. 4A and 4C are a perspective view and a side view, respectively, of another preferred embodiment of the bearing housing according to the present invention.
FIG. 4B is a perspective view showing a modification of FIG. 4A.

FIGS. 4A and 4C show another preferred embodiment of the bearing housing according to the present invention.

In this preferred embodiment, a housing body 220 and a flange member 210 are formed integrally with each other from a single piece of sheet metal to form a bearing housing 200.

As shown in FIG. 4A, opposite side portions of the housing body 220 having a pair of recesses 250 are bent toward a pinch roller (not shown) provided in a VTR or the like, that is, bent opposite to a direction depicted by an arrow A in which the pinch roller is to be pressed against the rotating shaft 17.

As shown in FIG. 4C, a plurality of projections 220a formed at the lower ends of the opposed side portions of the housing body 220 are inserted through a plurality of engagement holes 210a formed through the flange member 210. Then, the lower ends of the side portions of the housing body 220 are firmly fixed to the upper surface of the flange member 210 by spot welding or the like, and the projections 220a inserted through the engagement holes 210a are crimped from the lower surface of the flange member 210.

FIG. 4B shows a modification of this preferred embodiment, in which opposite side portions of a housing body 221 are bent in a direction opposite to that specified above, that is, in the direction of the arrow A where the pinch roller is to be pressed against the rotating shaft 17.

Thus, unlike the conventional bearing housing 1 shown in FIG. 14, the bearing housings 20 and 200 shown in FIGS. 3A to 4C are formed by working sheet metal rather than die casting using an expensive die, thereby reducing a manufacturing cost.

Furthermore, since a part of the housing body is bent, a sufficient strength of the bearing housing can be obtained.

The strength of the bearing housing to be obtained can be made fit to a required performance of the capstan motor in view of its strength by making the direction of bending of the housing body identical with the direction of pressing of the pinch roller.

Accordingly, a possibility that the bearing housing 20 (200) may be inclined on a chassis of equipment by a force applied from the pinch roller to cause deviation of adjustment of a tape path as in the related art can be effectively avoided.

Figure 5:
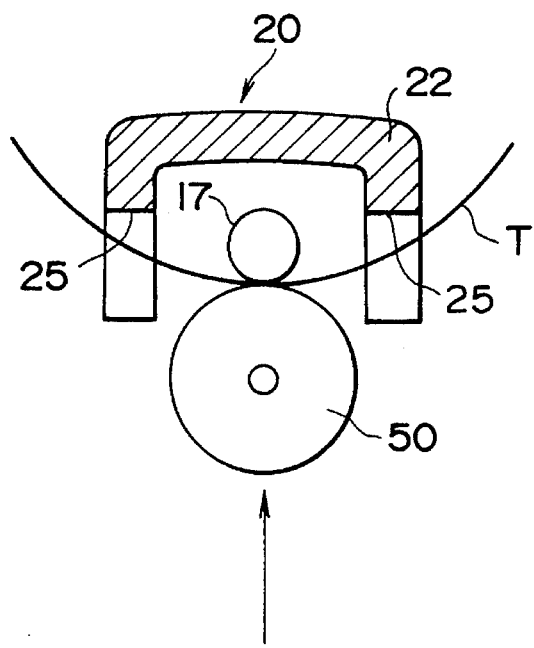
FIG. 5 is a partially sectional plan view illustrating the operation of recesses formed on the bearing housing according to the present invention.

Furthermore, since the bearing housing 20 (200) is formed from sheet metal in the above preferred embodiments, the recess 25 (250) can be deeply formed. Accordingly, as shown in FIG. 5, when a magnetic tape T is pressed against the rotating shaft 17 by a pinch roller 50 on a chassis of equipment such as a VTR, a radius of curvature of an arc described by the tape T about the center of the rotating shaft 17 can be reduced.

As a result, there is defined a room in space for arrangement of parts around the capstan motor on the chassis, thereby contributing to a reduction in size of the chassis.

FIGS. 7A and 7B, FIGS. 8A and 8B, and FIG. 9 show preferred embodiments of a mounting structure of the bearing housing according to the present invention which are also effective for the reduction in size of the chassis.

Prior to description of the preferred embodiments shown in FIGS. 7A to 9, a mounting structure of the conventional bearing housing 1 mounted on a chassis of equipment such as a VTR will be described with reference to FIG. 6.

Figure 6:
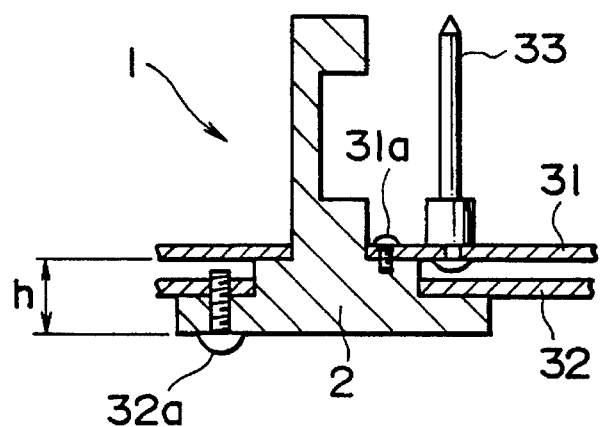
FIG. 6 is a schematic side view of a mounting structure of a bearing housing in the related art.

As shown in FIG. 6, the flange portion 2 of the bearing housing 1 formed as a die casting has a considerably large thickness h. The flange portion 2 is shouldered to form an upper step portion and a lower step;portion. A mounting board 31 is fixed to an upper surface of the upper step portion by a screw 31a.

By utilizing a space defined between the mounting board 31 and the lower step portion, a component such as a tape guide 33 provided adjacent to the capstan motor is fixed to the mounting board 31 by press fitting.

Further, a board 32 for the feed of an electric current to stator coils is fixed to an upper surface of the lower step portion from the lower side thereof by a screw 32a.

Accordingly, such a fixing structure as a whole has a considerably large thickness in the vertical direction as viewed in FIG. 6, thus hindering a reduction in size of the chassis.

Figure 7A:
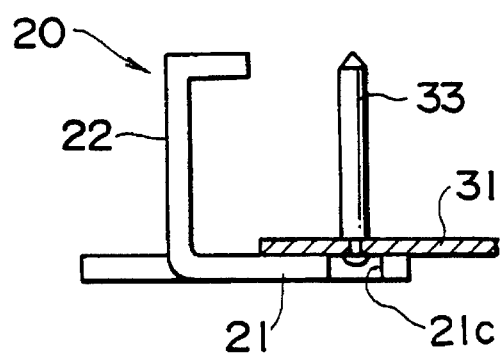
FIG. 7A is a schematic side view of a preferred embodiment of a mounting structure of the bearing housing according to the present invention.
Figure 7B:
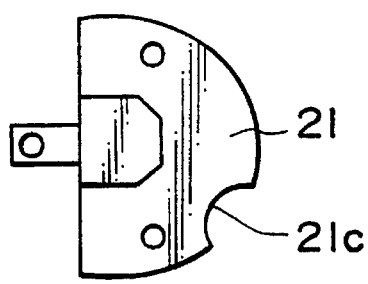
FIG. 7B is a bottom plan view of the bearing housing shown in FIG. 7A.

In the mounting structure shown in FIGS. 7A and 7B, an escape portion 21c as a semicircular recess is formed at a peripheral edge of the flange member 21.

With this structure, the tape guide 33 can be fixed to the mounting board 31 by utilizing the escape portion 21c as shown in FIG. 7A, and the mounting board 31 can be fixed to the flange member 21 by a screw, adhesive, etc.

Figure 8A:
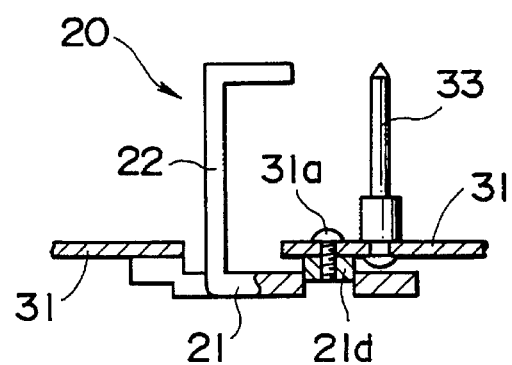
FIG. 8A is a schematic side view of another preferred embodiment of the mounting structure of the bearing housing according to the present invention.
Figure 8B:
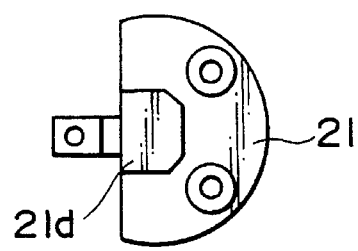
FIG. 8B is a bottom plan view of the bearing housing shown in FIG. 8A.

In the mounting structure shown in FIGS. 8A and 8B, an escape/fixing portion 21d as a half-blanked portion is formed near the center of the flange member 21 so as to project from an upper surface of the flange member 21.

With this structure, by utilizing the escape/fixing portion 21d, the mounting board 31 can be fixed to the flange member 21 at the escape/fixing portion 21d by the screw 31a as shown in FIG. 8A. Then, by utilizing a space defined between the mounting board 31 and the flange member 21 except the escape/fixing portion 21d, the tape guide 33 can be fixed by crimping or caulking to the mounting board 31.

Figure 9:
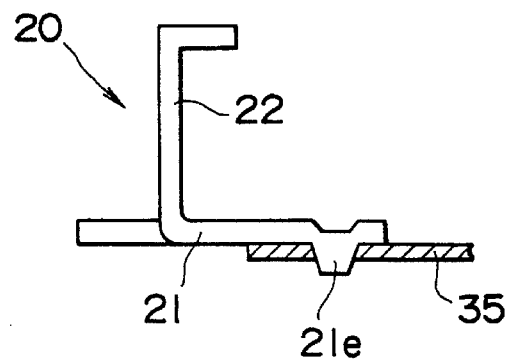
FIG. 9 is a schematic side view of still another preferred embodiment of the mounting structure of the bearing housing according to the present invention.

In the mounting structure shown in FIG. 9, a half-blanked portion 21e is formed on the flange member 21 so as to project from a lower surface of the flange member 21. The half-blanked portion 21e of the flange member 21 is crimped to a current feed board 35, thus fixing the flange member 21 to the current feed board 35.

Thus, each mounting structure for the bearing housing 20 (the capstan motor) can be reduced in thickness to thereby contribute to a reduction in size of a chassis of equipment.

Figure 12:
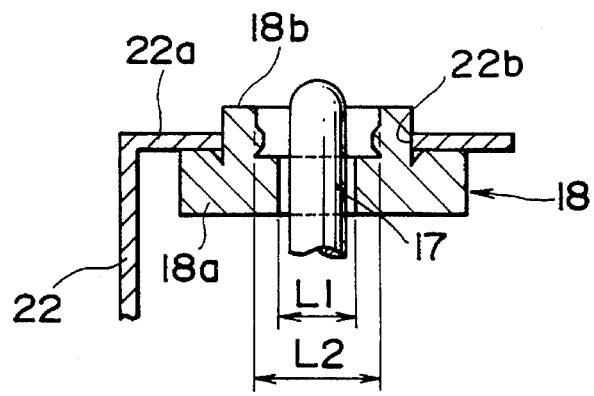
FIG. 12 is an enlarged side view of an essential part of the mounting structure of one of the bearing metals shown in FIG. 1.

FIG. 12 is an enlarged view of the bearing collar 18 of the bearing housing 20 shown in FIG. 1A.

Prior to description of the bearing collar 18, a mounting structure of such a bearing collar made of metal mounted to the housing body 22 will be described with reference to FIGS. 10 and 11.

Figure 10:
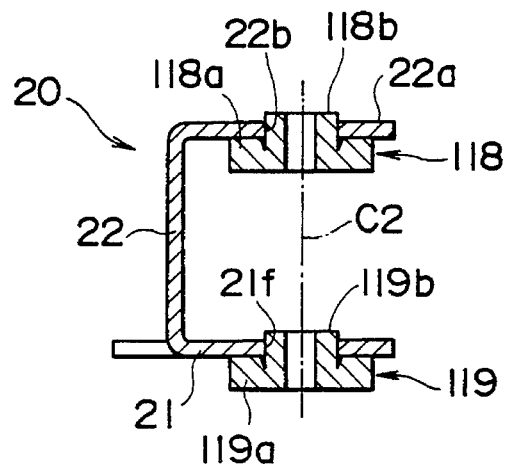
FIG. 10 is a schematic side view illustrating a mounting structure of bearing collars made of metal mounted on the bearing housing according to the present invention.

As shown in FIG. 10, the thickness of both the flange member 21 and an upper end portion 22a of the housing body 22 forming the bearing housing 20 is smaller than that of the conventional die-cast product, because the flange member 21 and the housing body 22 are formed from sheet metal as mentioned previously.

In press-fitting bearing collar made of metal 118 and 119 into bearing holes 22b and 21f formed through the upper end portion 22a and the flange member 21, respectively, the bearing collar 118 and 119 must be aligned so as to ensure straightness along the center line C2 as the axis of the rotating shaft 17 of the capstan motor 10.

In this respect, the alignment of such bearing collar in the conventional bearing housing formed by die casting can be relatively easily obtained by ensuring the accuracy of a die to be used in die casting.

In contrast thereto, if cylindrical bearing collar made of metal as in the conventional bearing housing 1 are press-fitted into the bearing holes 22b and 21f of the bearing housing 20 formed from thin sheet metal, the alignment of the cylindrical bearing collar is difficult. Therefore, it is necessary to use the bearing collar 118 having a flange portion 118a and a press-fitting portion 118b and the bearing metal 119 having a flange portion 119a and a press-fitting portion 119b as shown in FIG. 10.

However, in forming the bearing hole 22b through the upper end portion 22a, for example by means of a punch, and repeating this punching work for manufacture of similar other bearing housings, the punch is worn to result in a gradual decrease in diameter of the bearing hole 22b during the repetition of the punching work.

Figure 11:
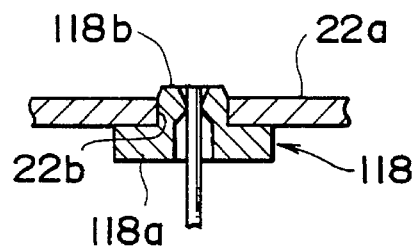
FIG. 11 is a schematic side view of one of the bearing metals shown in FIG. 10.

Accordingly, in forcing the press-fitting portion 118b of the bearing collar 118 into the bearing hole 22b reduced in diameter, there is a possibility that an inner diameter of the press-fitting portion 118b may be reduced as shown in FIG. 11.

To cope with this, as shown in FIG. 12, an inner diameter L1 of the flange portion 18a is set somewhat larger than an outer diameter of the rotating shaft 17, and an inner diameter L2 of the press-fitting portion 18b is set larger than the inner diameter L1 of the flange portion 18a so that even though the inner diameter L2 is reduced in forcing the press-fitting portion 18b into the bearing hole 22b, the inner diameter L2 remains large enough to rotatably receive the rotating shaft 17.

Further, in order to prevent that a lubricating oil flowing around the rotating shaft 17 inside the bearing collar 18 may be splashed by rotation of the rotating shaft 17, a wall thickness of the flange portion 18a around the rotating shaft 17 is set sufficiently large.

Although the structure of the bearing collar 18 only has been described above, the other bearing collar 19 also has a similar structure.

Figure 13:
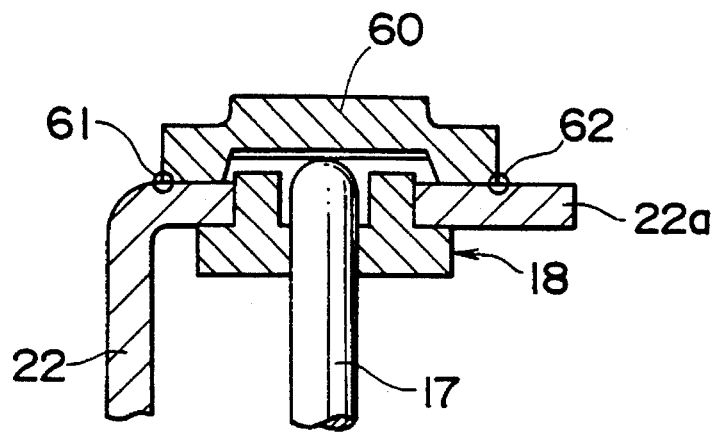
FIG. 13 is an enlarged side view of a thrust plate shown in FIG. 1.

Further, as shown in FIG. 13, a thrust plate 60 formed from sheet metal and having a suitable shape as shown is placed on the upper end portion 22a of the housing body 22, and is welded at 61 and 62 to the upper end portion 22a.

Thus, the rotating shaft 17 can be rotatably supported to the bearing housing 20.

It is to be noted that the present invention is not limited to the preferred embodiments mentioned above.

For example, various materials for the sheet metal to be formed into the bearing housing may be selected on condition that they are tough and light in weight so as to fit for the bearing housing of the capstan motor.

What is claimed is:

1. A bearing housing of a capstan motor, for supporting a rotating shaft of said capstan motor, said bearing housing being formed from sheet metal and having a deep recess for exposing said rotating shaft, wherein said bearing housing comprises:

a flange member;

a housing body extending from said flange member in the axial direction of said rotating shaft;

said housing body having opposed side portions directed to form a semi-circular notch with a concave surface facing a pinch roller where the pinch roller is pressed against said rotating shaft, wherein said bearing housing further comprises a bearing collar made of metal mounted on said housing body for rotatably supporting said rotating shaft, said bearing collar having a flange portion abutting against an inside surface of said housing body and a press-fitting portion press-fitted with a mounting hole formed through said housing body, said bearing collar press-fitting portion having an inner diameter greater than that of said bearing collar flange portion.

2. A bearing housing of a capstan motor as in claim 1, wherein said capstan motor comprises a flat stator portion and a flat rotor portion.

3. A bearing housing of a capstan motor according to claim 1, wherein said housing body is formed independently of said flange member.

4. A bearing housing of a capstan motor according to claim 1, wherein said housing body is formed integrally with said flange member.

5. A bearing housing of a capstan motor as in claim 1, further comprising a thrust plate welded to an upper end portion of the housing body.

6. A bearing housing of a capstan motor, for supporting a rotating shaft of said capstan motor, said bearing housing being formed from sheet metal and having a deep recess for exposing said rotating shaft, wherein said bearing housing comprises:

a flange member;

a housing body extending from said flange member in the axial direction of said rotating shaft;

said housing body having opposed side portions directed to form a semi-circular notch with a concave surface facing a pinch roller where the pinch roller is pressed against said rotating shaft;

a fixing portion formed near the center of the flange member so as to project from an upper surface of the flange member;

a mounting board fixed to the flange member at the fixing portion for mounting a component thereon at a position adjacent to said capstan motor; and a recess defined between the mounting board and the flange member which abuts to the fixing portion;

wherein said recess is an escape portion for fixing said component to the mounting board; and wherein said flange member is a semicircular piece of sheet metal.

7. A bearing housing of a capstan motor as in claim 6, wherein said capstan motor comprises a flat stator portion and a flat rotor portion.

8. A bearing housing of a capstan motor as in claim 6, further comprising a thrust plate welded to an upper end portion of the housing body.

* * * * *